United States Patent
Aksenfeld et al.

(10) Patent No.: US 11,636,021 B2
(45) Date of Patent: Apr. 25, 2023

(54) PRESERVING SYSTEM INTEGRITY USING FILE MANIFESTS

(71) Applicant: VMware, Inc., Palo Alto, CA (US)

(72) Inventors: Yan Aksenfeld, Herzliya (IL); Yakov Voloch, Herzliya (IL); Ran Apel, Herzliya (IL)

(73) Assignee: VMware, Inc., Palo Alto, CA (US)

(*) Notice: Subject to any disclaimer, the term of this patent is extended or adjusted under 35 U.S.C. 154(b) by 698 days.

(21) Appl. No.: 15/590,277

(22) Filed: May 9, 2017

(65) Prior Publication Data

US 2018/0330082 A1    Nov. 15, 2018

(51) Int. Cl.

| | |
|---|---|
| *G06F 21/57* | (2013.01) |
| *G06F 11/30* | (2006.01) |
| *G06F 11/07* | (2006.01) |
| *G06F 11/14* | (2006.01) |
| *G06F 11/36* | (2006.01) |
| *H04L 9/40* | (2022.01) |
| *H04L 9/32* | (2006.01) |
| *H04L 9/00* | (2022.01) |
| *H04L 41/0869* | (2022.01) |

(52) U.S. Cl.
CPC ...... *G06F 11/3604* (2013.01); *G06F 11/0793* (2013.01); *G06F 11/3013* (2013.01); *G06F 11/3055* (2013.01); *G06F 11/3086* (2013.01); *G06F 21/577* (2013.01); *H04L 9/002* (2013.01); *H04L 9/3247* (2013.01); *H04L 63/123* (2013.01); *H04L 63/1416* (2013.01); *G06F 11/1453* (2013.01); *G06F 11/1461* (2013.01); *H04L 41/0869* (2013.01)

(58) Field of Classification Search
None
See application file for complete search history.

(56) References Cited

U.S. PATENT DOCUMENTS

| | | | |
|---|---|---|---|
| 2007/0038857 A1* | 2/2007 | Gosnell | G06F 16/10 713/165 |
| 2007/0157315 A1* | 7/2007 | Moran | H04L 63/1425 726/23 |

(Continued)

OTHER PUBLICATIONS

Brian Krebs; "1,025 Wendy's Locations Hit in Card Breach"; https://krebsonsecurity.com/tag/wendys-breach/; Jul. 8, 2016; captured on Mar. 26, 2017.

(Continued)

*Primary Examiner* — Irene Baker

(57) ABSTRACT

A system is described for preserving integrity of computing devices. A manifest that uniquely identifies files on a computing device is periodically captured from the computing device. The manifest is compared against a reference manifest, which represents an ideal or clean state of the device. If the manifest comparison indicates that there have been changes to the contents of the computing device, the system can determine whether the changes constitute a compromise to the endpoint's integrity. If it is determined that a change constitutes a compromise to the endpoint's integrity, the system can perform certain remedial actions, such as sending a message to an administrator or enforcing a base layer onto the device so that the content of the device is replaced with a clean image.

20 Claims, 5 Drawing Sheets

(56) References Cited

U.S. PATENT DOCUMENTS

| | | | | |
|---|---|---|---|---|
| 2008/0178290 A1* | 7/2008 | Besch | ............ | G06F 21/566 |
| | | | | 726/22 |
| 2009/0006640 A1* | 1/2009 | Brouwer | ............ | G06F 11/10 |
| | | | | 713/180 |
| 2010/0062844 A1* | 3/2010 | Crowder, Jr. | ............ | G06F 21/57 |
| | | | | 463/29 |
| 2012/0144383 A1* | 6/2012 | Mishra | ............ | G06F 11/0793 |
| | | | | 717/173 |
| 2013/0227714 A1* | 8/2013 | Gula | ............ | H04L 63/1408 |
| | | | | 726/32 |
| 2014/0013434 A1* | 1/2014 | Ranum | ............ | G06F 21/564 |
| | | | | 726/24 |
| 2015/0058619 A1* | 2/2015 | Sweet | ............ | H04L 63/0428 |
| | | | | 713/155 |
| 2016/0299818 A1* | 10/2016 | Vijayan | ............ | G06F 16/1748 |
| 2017/0177867 A1* | 6/2017 | Crofton | ............ | G06F 21/565 |

OTHER PUBLICATIONS

Tripwire, Inc. product web-page; "File Integrity and Change Management—FIM"; http://www.tripwire.com/solutions/file-integrity-and-change-monitoring/; captured on Mar. 26, 2017.
Verisys product web-page; "Verisys File Integrity Monitoring"; https://www.ionx.co.uk/products/verisys; captured on Mar. 26, 2017.
McAfee product web-page; "McAfee Change Control"; https://www.mcafee.com/uk/products/change-control.aspx; captured on Mar. 26, 2017.

* cited by examiner

| Name | Path | Size | Create Time | Modify Time | Signature |
|---|---|---|---|---|---|
| mpasbase.vdm | c:\\Windows\System32\config\software.... | 62390272 | 11/16/2015 12:37 | 11/19/2015 9:57 | E9876YHI4763890GTKLJ386KJN5KM54K... |
| events00.rbs | c:\\Windows\System32\Diagnosis... | 51545689 | 10/05/2015 09:30 | 11/10/2015 19:01 | R8EO398FJ3O3984LJF908LK324KF908R... |
| mpengine.dll | c:\\Windows\System32\Microsoft... | 1564865264 | 12/16/2015 22:39 | 01/16/2016 02:16 | 8HJR8937NR8E73HF93IJ39JDF93HY38J... |

FIG. 2

PRESERVING SYSTEM INTEGRITY USING FILE MANIFESTS

TECHNICAL FIELD

The present disclosure generally relates to ensuring computing system integrity, and more specifically to techniques for efficient detection and remediation of security breaches and data corruption in computing devices.

BACKGROUND

As computers continue to take an increasingly prominent role in the world of business, it is becoming more and more important to ensure the integrity of computing systems, particularly ones handing sensitive information or performing critical functions. A compromise in device integrity, whether caused by an attack such as malware or a virus, or innocently via data corruption, can result in the leakage of sensitive information and downtime, either of which can result in significant losses in time and money for businesses and consumers alike.

Particularly in situations where computing devices operate as terminals, providing access points for consumers while located in a physically remote location from the enterprise responsible for the proper functioning and operation of the devices, significant challenges are encountered. Common examples of such terminals include automatic teller machines (ATMs), credit card readers, kiosks, point of sale (POS) devices, and so on. For example, some devices, such as ATMs, are common targets of intruders attempting to obtain users' debit card and account information. Further, because ATMs and other terminal devices are often left unattended by personnel, they can be particularly vulnerable to attacks by malicious individuals.

To address these risks, an enterprise responsible for the security and operation of such terminals needs to be able to detect issues such as intrusions, viruses, or data corruption remotely and remediate the issues in a timely manner. However, even when a problem can be detected remotely, remediating the issue can require a technician to travel to and manually service the terminal, which entails significant costs in time and money for the enterprise. To compound these difficulties, an enterprise may need to attend to hundreds or thousands of terminals on an ongoing basis, the terminals may be spread over geographically broad areas, and connectivity to the terminals may be limited.

Companies such as Tripwire, Inc.; Qualys, Inc.; Ionx Solutions LLP; Intel Security Group (previously McAfee, Inc.); and others provide products that attempt to address these problems. However, the existing solutions have numerous shortcomings in addressing the issues discussed above as well as other problems. A more efficient approach is desirable for preserving system integrity of computing systems.

BRIEF DESCRIPTION OF THE DRAWINGS

FIG. 2 illustrates an example file manifest, in accordance with various embodiments.

DETAILED DESCRIPTION

Figure 1:
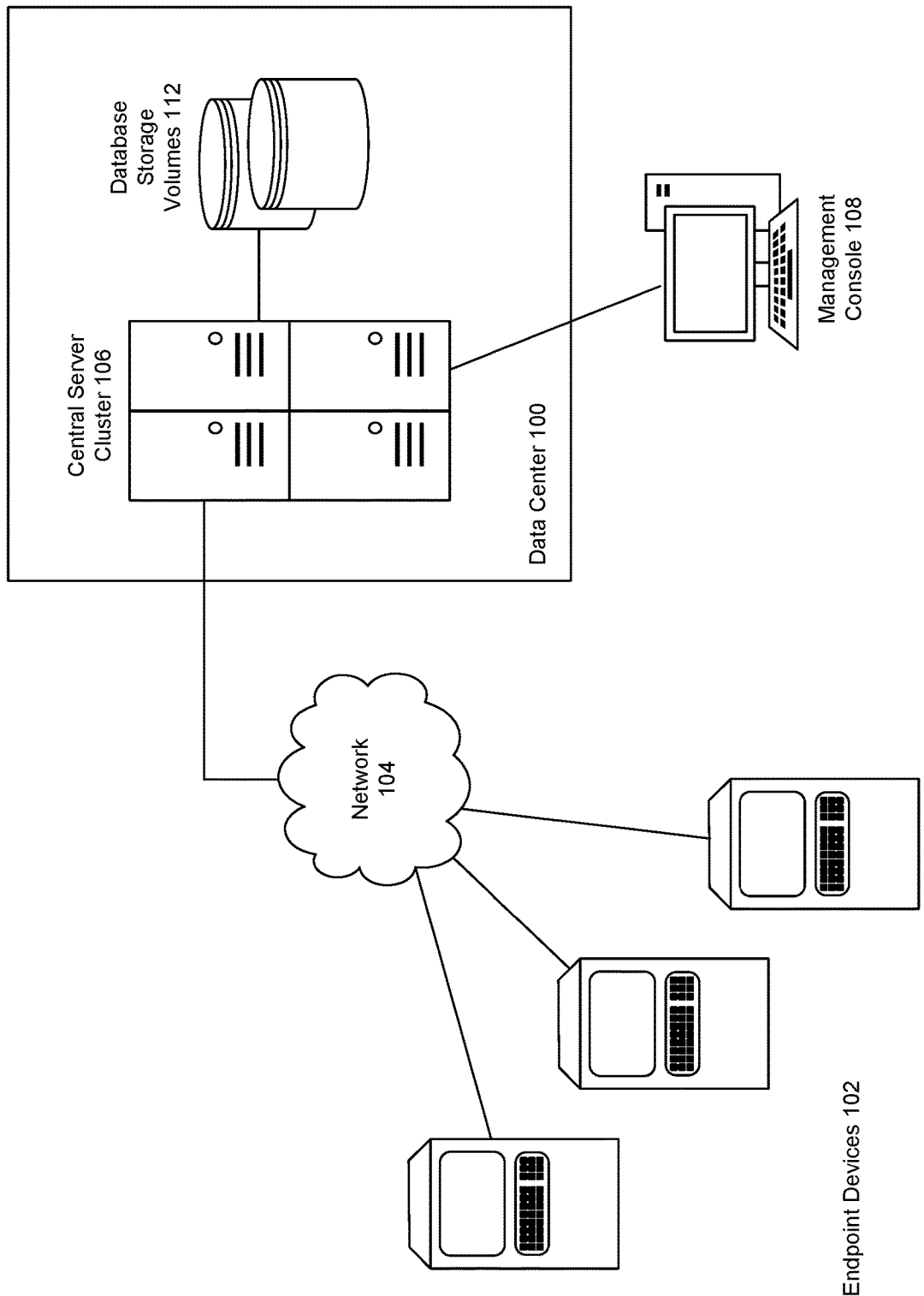
FIG. 1 illustrates an example of a server-based endpoint integrity preservation system, in accordance with various embodiments.

Systems and methods in accordance with various embodiments of the present disclosure overcome at least some of the above-mentioned shortcomings and deficiencies by providing more efficient ways to monitor and preserve integrity of computing devices and systems. Embodiments described herein leverage an architecture for checking a computing device's contents against a reference manifest to determine what changes have taken place on the computing device, and for taking remedial action when certain types of changes are detected.

In this architecture, a manifest that uniquely identifies files on a computing device is periodically captured on the computing device. The manifest is compared against a reference manifest, which represents an ideal or clean state of the device, or at least the state of the device at some previous point in time. If the manifest comparison indicates that there have been changes to the contents of the computing device, the system can then determine whether the changes constitute a compromise to the endpoint's integrity. The determination can be performed based on a policy file, which indicates, for example, that addition, modification, and/or removal of certain types of files (e.g., executable files) constitutes a compromise to the endpoint's integrity. The policy file can also indicate that certain types of files and certain locations, such as folders, can be ignored in the monitoring process (e.g., if those types of files or locations are deemed to be harmless or safe).

Consequently, if it is determined that a change constitutes a compromise to the endpoint's integrity, the system can perform certain remedial actions. In an embodiment, a remedial action may be to send a message to an administrator (e.g., to an administrator's device or to a module through which the administrator interfaces with the system) indicating that the endpoint's integrity has been compromised. The message can also include details identifying the specific change that is deemed to constitute the compromise to the endpoint's integrity to allow the administrator to analyze and remedy the compromising change to the device. In another embodiment, a remedial action may be to repair the change that is deemed to constitute a compromise to the device's integrity, to bring the endpoint back into compliance. For example, such a repair may be performed by enforcing or merging a base image onto the device so that the entire content of the device or some portion of the content is replaced with a clean image. In other embodiments, the repair may be performed by replacing portions of the content of the device that are deemed to be compromised, such as by merging a layer that replaces the compromised portion, without replacing the entire system image.

In the ideal embodiment, multiple client devices, or endpoints, can be managed remotely by a central server. In this case, the manifest may be captured on each endpoint by an agent operating on the endpoint and conveyed to the central server. The server can compare the manifest to a reference manifest for each endpoint and determine if remedial action is needed. If remedial action is needed for an endpoint, then, for example, the server can notify the administrator or enforce a base image onto the endpoint. For example, this may be implemented in a situation where numerous ATMs are managed centrally in a banking environment.

In other embodiments, the systems and methods may be implemented in an enclosed environment, i.e., without communication with a remote server. In this case, any applicable operations mentioned above may be performed on the device or endpoint itself. For example, the steps of capturing the manifest, comparing it to the reference manifest, determining that the system is compromised, and taking remedial actions may be implemented by the endpoint itself. This may be desirable in situations where an endpoint lacks network connectivity, where connectivity is undesirable, or where connectivity is poor. In yet other embodiments, any of the described steps may be performed on the endpoint while any others are performed on the server.

The system offers numerous advantages for an enterprise. For example, the enterprise can remotely monitor endpoints, such as ATMs, kiosks, POS devices, etc. to ensure compliance and, if a compromise to the endpoint's integrity is detected, the system can either automatically repair the endpoint, e.g., by enforcing a base layer, or the system can notify the administrator and allow the administrator to trigger a remedial operation.

In other embodiments, the system can be integrated with a backup and restore system servicing endpoints. For example, the backup and restore system, such as Mirage, available from VMware, Inc., may utilize file manifests for performing an endpoint backup and for synchronizing any ongoing changes between the backup system and the endpoint. The same manifests generated by such a system for backup purposes may also be used for preserving system integrity as described in further detail later in this document. Further, certain management systems, such as Mirage, enable layer merging capabilities. The layer merging mechanism of such systems can be implemented for performing remedial actions, such as enforcing the base layer, by a system for preserving system integrity as described herein.

In further embodiments, the system can allow enterprises to obtain insight into how endpoints are being used. In this implementation, the same mechanism of comparing manifests can be used to identify changes to files. The remedial action may be a report of the changes that is produced and conveyed to administrators or users of the system. For example, such systems can build reports based on the changes of multiple endpoints to help management better understand the trends of work and utilization of software in the organization.

FIG. 1 illustrates an example of a server-based endpoint integrity preservation system, in accordance with various embodiments. As illustrated in this example, the system can be used to preserve integrity of a plurality of endpoint devices 102. While only three endpoints are illustrated, in a real-world scenario the system may comprise any number of endpoints. An endpoint may be any type of computing device, including a personal computer, a laptop, an ATM, a kiosk, a terminal, a device in a POS system, and so on. While the system may be implemented on any type of computing device, it may be particularly efficient and advantageous on endpoints that are relatively static, i.e., where a limited amount of content changes over time or where content only changes within certain limited areas on the system, such as ATMs, kiosks, POS systems, and other types of devices.

The endpoints 102 may be communicatively linked via a network 104 to a data center 100. The network 104 may be a wide area network (WAN), the Internet, or other form of remote communication link between the endpoints 102 and the data center 100. The deployment of the system in the data center 100 may comprise a central server cluster 106, database storage volumes 112 that can be used to store various data in the system such as manifests and base layers, and a management console 108 that can be accessed by an administrator to interface with the system.

In various embodiments, an agent application is installed on every endpoint device 102. The agent generally operates in the background on an endpoint while the device is in operation or in use. While operating in the background, the agent can perform several functions, including capturing manifests on the endpoint, sending manifests to the server 106, receiving instructions from and communicating with the server 106, and performing remedial actions on the endpoint such as enforcing a base layer.

As will be described in further detail below, to ascertain endpoint 102 integrity, a manifest is captured (e.g., by an agent) on each endpoint and conveyed to the server 106 via the network 104. For example, the manifest may be captured on a preset schedule or periodically, such as every hour; the exact schedule may be configurable according to organizational needs. On the server 106, a reference manifest is retrieved for each endpoint (e.g., from the database 112) and compared with the manifest received from the endpoint. A different reference manifest can be maintained on the server 106 for each endpoint 102. In one embodiment, a reference manifest may be the first manifest that the server received from the endpoint at the time when the endpoint first establishes communication with the server. In different embodiments, reference manifests may be maintained in other locations, such as in the database 112. The captured manifest from the endpoint is compared with the endpoint's reference manifest to determine whether a change that constitutes a compromise in the endpoint's integrity has occurred. If no compromise is recognized, then the process ends and the check is performed again on the next interval. If, however, the server 106 detects that a compromise to an endpoint's integrity has occurred, a remedial action can be triggered. For example, a warning message can be sent to the management console 108, the endpoint's operation may be suspended, and/or actions can be taken to repair the non-compliance, such as enforcing a base layer on the compromised endpoint.

As used herein, the term "manifest" or "file manifest" refers to a listing of files located on an endpoint, which may be captured from an endpoint and stored in a table or data structure. The manifest can uniquely identify files, for example with a unique signature, such that a change in the file would result in a change in the signature. For example, a manifest may contain metadata that identifies each file on an endpoint image and the file's corresponding unique signature.

In this way, to check whether a file on an endpoint has been changed from a previous point in time, a signature of the file from the previous point in time can be compared with current signatures of files on the endpoint. If a matching signature is located, then the system can conclude that the file did not change, whereas if a matching signature is not found, then the system can conclude that the file changed or was removed. Similarly, the method can be used to check whether other properties of files (file paths, write permissions, etc.) have changed by checking, after a matching signature is located, whether such other properties are the same. The process may be substantially more efficient than comparing entire contents of a file to detect change, since signatures are generally significantly smaller in size than a file and can be produced efficiently. For example, a signature may be a hash value calculated using a hash function such as the MD5 hash function. Thus, by comparing the metadata and signatures of files in a current manifest captured from an endpoint with a reference manifest, the system can determine what files are different, missing, or additional on the endpoint relative to the state of the endpoint when the reference manifest was captured.

FIG. 2 illustrates an example file manifest, in accordance with various embodiments. In various other embodiments, a manifest may be a binary file and also be encrypted; it is illustrated here in readable format for purposes of illustration. The example manifest of FIG. 2 lists various metadata and a corresponding signature for three files. In a real-world implementation, a manifest may contain information for a significantly larger number of files (e.g., for each file on an endpoint); only three files are demonstrated here for the sake of being concise. In the example manifest, each row lists information for a file and the information is organized into columns by the categories "Name", "Path", "Size", "Creation Time", "Modify Time", and "Signature". "Name" can refer to the name of the file, "Path" can refer to the file path in the file system, "Size" can refer to the file size (e.g., in bytes), "Creation Time" can refer to the date and time when the file was created, "Modify Time" can refer to the date and time when the file was last modified, and "Signature" can include the unique file signature, such as a hash value for the file.

As will be appreciated by one skilled in the art, the manifest illustrated in FIG. 2 is only by way of example. In other implementations, a manifest may contain various other data and include additional categories of information for each listed file. Such information may be, for example, a metadata signature for each file, which may be a security signature of the file. In various embodiments, the system can track whether such metadata signatures of files have changed based on the manifest comparison, and various changes in the metadata signatures may be deemed compromises to endpoint integrity. For example, this way certain aspects can be tracked, such as when a user who previously only had read permission receives write permission.

To capture a manifest, an endpoint (or an agent on the endpoint) performs a scan of the endpoint's file system to capture the list of files. Each file in the file system can be scanned, a signature can be calculated, metadata or other data can be collected, and this information can be stored in the manifest. Various methods can be used to capture the manifest. A full scan can be performed of the whole file system. A full scan may be performed initially on an endpoint (e.g., to produce the reference manifest) or every time a manifest is created. However, after the full scan, other, more limited, manifest capturing methods can be used that don't scan the entire system but target the files that have been changed (including new files). Such scanning methods may be quicker and more efficient than scanning the entire file system each time. Examples of such methods are light scans and hint-based scans. In a light scan, only new files and files whose metadata has changed may be scanned (e.g. modified date). In a hint-based scan, a component on the endpoint, such as a filter driver, records files that have been changed or added in a set of hints. The endpoint (e.g., via the agent) then utilizes the set of hints to scan the new or changed files. Hence, when such limited scans are implemented, the system can assume that the files that were not scanned have remained unchanged.

In an ideal embodiment, the manifest encompasses the entire file system of the endpoint, even though various portions of the endpoint may be considered irrelevant and may be ignored when ascertaining system integrity. However, by capturing a manifest of the entire file system, users such as administrators may have the flexibility to modify which areas of the system they wish to track and monitor easily, such as by modifying the policy file, without having to alter the manifest capturing process. Nonetheless, in other embodiments, the system may be configured to capture manifests covering only a portion of the file system of the endpoint, e.g., the portion which is deemed to be of most concern.

In various embodiments, the reference manifest is a manifest that is captured at some point in time that represents a baseline reference state of the endpoint so that the endpoint's integrity can be ascertained in the future by comparing future manifests captured from the endpoint to the reference manifest. Hence, in various embodiments, a reference manifest can be captured from an endpoint at any point in time but preferably when the endpoint is known to be compliant and in good integrity. For example, a reference manifest can be captured from an endpoint in a clean state, such as when an endpoint is initially set up. In embodiments utilizing a base layer, the reference manifest can also correspond to the base layer. For example, the reference manifest can be produced based on a particular base layer. A base layer can be a baseline, clean image of the entire contents of an endpoint that can be merged onto the endpoint to either initially provision the endpoint or to return the endpoint to an initial clean state. A reference manifest corresponding to a base layer can be captured by merging the base layer onto an endpoint and subsequently capturing the reference manifest by scanning the file system of the endpoint.

In various embodiments, if a preexisting reference manifest is not available when the system is deployed onto an endpoint, the system can mark the first manifest that it receives from the endpoint as a reference manifest. Then, subsequent manifests that are received from the endpoint can be compared with this reference manifest when ascertaining system integrity.

Figure 3:
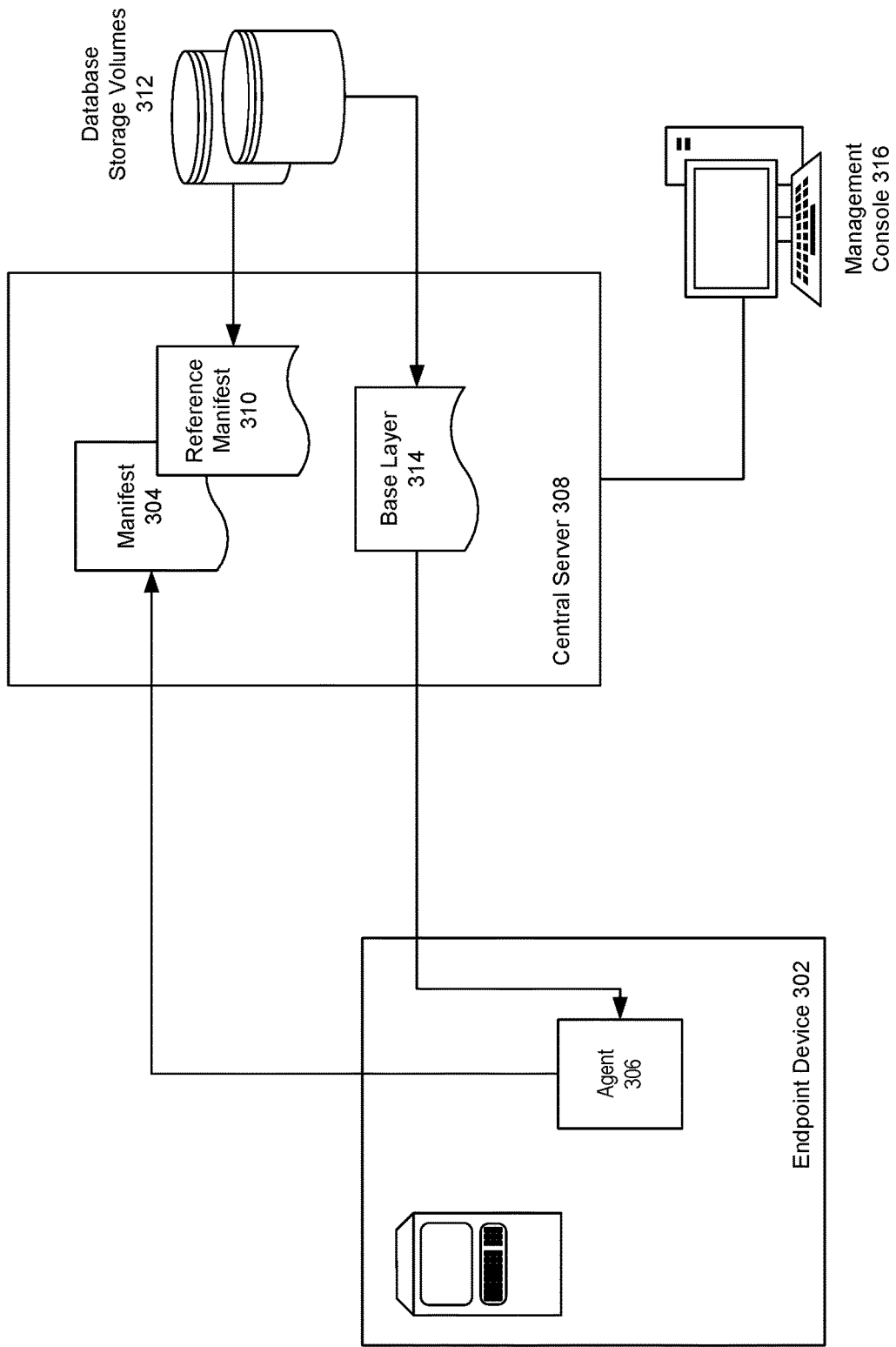
FIG. 3 illustrates an example diagram of an integrity preservation system operating in conjunction with an endpoint device, in accordance with various embodiments.

FIG. 3 illustrates an example diagram of an integrity preservation system operating in conjunction with an endpoint device, in accordance with various embodiments. The process can begin with an agent 306, which can be an application or module executing in the background on the endpoint 302, capturing a manifest 304 on the client device and conveying the manifest to the central server 308. In various embodiments, the agent 306 can be configured to capture and convey the manifest 304 on a set schedule or periodic basis (e.g., hourly). The agent 306 can perform a full scan or a limited scan, such as a light scan or a hint-based scan, to capture the manifest 304, as described above.

Once the manifest is received at the server 308, the server 308 can check in database storage volumes 312 for a reference manifest 310 assigned to the endpoint 302. Once the reference manifest 310 is located, it is retrieved from the database 312 and compared with the received current manifest 304.

In various embodiments, if the server 308 cannot locate a reference manifest for the endpoint 302, then the current manifest 304 can be set as the reference manifest for the endpoint and stored in the database 312. Then, subsequently received manifests (e.g., at the next integrity checking period) can be compared with this reference manifest to ascertain endpoint integrity. In another embodiment, if a reference manifest is not available, then the server can signal the agent 306 to perform a full scan of the endpoint to produce a manifest that will be used as the reference manifest for the endpoint.

In the server 308, the received manifest 304 from the endpoint 302 can be compared against the reference manifest 310 to identify differences between the manifests. Differences between the manifests may indicate that certain differences are present between the endpoint's 302 current state and the reference state of the endpoint corresponding to the reference manifest 310, or that certain changes have taken place on the endpoint 302 as compared to the reference state.

For example, the manifest comparison may determine which file signatures are present in the reference manifest 310 and not present in the current manifest 304, and which file signatures are present in the current manifest 304 and not present in the reference manifest 310. Further, when a signature is present in both manifests (304 and 310) the manifest comparison can determine whether other information, such as file paths, write permissions, any metadata, etc. related to the corresponding file is different between the manifests. For example, if the same signature is found in both the current manifest 304 and the reference manifest 310 but the file path to the file is different in the current manifest 304 than in the reference manifest 310, then the comparison can indicate that this difference in file paths is detected.

Hence, the manifest comparison may be able to detect when a file was removed, when a new file was added, when a file was changed, or when other data related to a file (file path or other properties) is changed. For example, if a new file was added to the endpoint 302, then the manifest 304 will list a signature of the new file, while the reference manifest 310 will not. If a file was removed from the endpoint 302, then the reference manifest 310 will list a signature of the missing file, while the current manifest 304 will not. If a file was changed on the endpoint 302, then the reference manifest 310 will list a signature of the original file and the current manifest 304 will not, while the current manifest 304 will list a signature of the changed file and the reference manifest 310 will not. Hence, if a file is changed, the manifest comparison will indicate that the original file is missing from the endpoint 302 and that a new file (the changed file) is present on the endpoint 302. If only a file's path (or other property) is changed without changing content of the file, then the reference manifest 310 and the current manifest 304 will list the same signature for the file but the file paths (or other properties) in the manifests will be different.

Once the system identifies what difference exist or what changes have taken place on the endpoint 302 compared to the reference state, it can determine whether the identified changes or differences constitute a compromise to the endpoint's 302 integrity. Namely, because some changes on the endpoint 302 may be permissible and not be considered harmful, the system can contain certain logic for determining what types of identified differences or changes should trigger remedial actions. In other embodiments, the system can be absolute, such that any change whatsoever triggers remedial actions.

For example, the system may contain a policy, which may be defined by the IT department or by an administrator, which identifies what types of changes or differences between the manifest 304 and the reference manifest 310 are tolerable, and what kinds of differences should be deemed a compromise to the endpoint's 302 integrity. For example, the policy may define file types (or extensions) that are deemed to be potentially harmful. The policy may indicate that changes to such potentially harmful types of files or to files with certain extensions (e.g., executable, PE (portable executables), or DLL (dynamic link library) files) are not permissible, i.e., changes to such files (or to properties such as the file path) should be deemed a compromise to the endpoint's 302 integrity. The policy may also indicate that presence of new files of certain potentially harmful types should be deemed a compromise, or that presence of any new files at all should be deemed a compromise. The policy may indicate that missing files of certain types constitutes a compromise, or that missing files of any type at all constitutes a compromise. The policy may further indicate certain specific files that, if changed or if removed, would constitute a compromise.

The policy may likewise define certain "safe" types of files which are deemed to be safe or harmless (e.g., text files), so that if such types of files are added, modified, and/or missing, the system does not determine it to be a compromise, or so that changes to or additions of such files are ignored in the tracking process. For example, any identified differences corresponding to files of a type that is deemed to be safe can be ignored when determining whether identified differences constitute a compromise to an endpoint's integrity.

The policy can also define certain areas of the endpoint's 302 contents (e.g., folders or directories) that are deemed safe, such that new files, missing files, or changed files in such safe areas are not considered a compromise or are ignored in the tracking process. For example, identified differences corresponding to files in location deemed to be safe can be ignored when determining whether identified differences constitute a compromise to an endpoint's integrity. Similarly, the policy can define certain areas of the endpoint's 302 contents (e.g., folders or directors) that are deemed potentially harmful, such that new files, missing files, or changed files in such potentially harmful areas are considered a compromise.

It should be noted that the determination of which file types or extensions, and/or which locations on an endpoint are potentially harmful and should be tracked and which file types, extensions, and/or locations are safe and need not be tracked depends on the particular system (e.g., operating system) and architecture of the endpoint, and so this determination should be made specifically with respect to a particular endpoint and/or the particular requirements and goals in a given implementation.

For example, if a manifest comparison finds a file signature in the current manifest 304 that is not present in the reference manifest 310, the system can check whether the type of the file is deemed potentially harmful and trigger remedial action if it is. The system can also check whether the file is located in a potentially harmful location and trigger remedial action if it is. Conversely, if the file is of a "safe" type or is located in a "safe" location, the system can overlook the detected difference.

If a manifest comparison finds a file signature in the reference manifest 310 that is not present in the current manifest 304, the system can check whether the type of the file is deemed potentially harmful and trigger remedial action if it is. The system can also check whether the file is located in a potentially harmful location and trigger remedial action if it is. Conversely, if the file is of a "safe" type or is located in a "safe" location, the system can overlook the detected difference.

Further, if a manifest comparison finds the same file signature in the reference manifest 310 and in the current manifest 304 but with different associated data in each manifest (such as file path or any other file-related property desired to be monitored), the system can check whether the type of the file is deemed potentially harmful and trigger remedial action if it is. The system can also check whether the file is located in a potentially harmful location and trigger remedial action if it is. Conversely, if the file is of a "safe" type or is located in a "safe" location, the system can overlook the detected difference.

Thus, once the changes or differences between the manifest 304 and the reference manifest 310 are identified, the system can check against the policy to determine whether the changes or differences constitute a compromise to the endpoint's 302 integrity. If the system determines that a compromise did not occur, then the process ends and is repeated once a subsequent manifest is captured on the endpoint 302 and conveyed to the server 308 at the next scheduled checking interval. If on the other hand, a compromise is detected, then the server can trigger a remedial action. In various embodiments, different remedial actions can be triggered by the server in the event of a detected endpoint 302 compromise.

In one embodiment, the server 308 can send a notification to the management console 316, providing notice of the compromise. Such notice may include information (e.g., in a text file) providing various data regarding the compromised files and/or the nature of the compromise. In another embodiment, the system may automatically perform a repair on the endpoint when a compromise is detected. Such a repair may, for example, involve enforcing a base layer 314 onto the endpoint 302. In other embodiments, the repair may involve other techniques, such as enforcing a layer that does not replace the entire system (as a base layer) but only a portion of the system that contains the compromised components. In yet other embodiments, the repair may involve more targeted approaches for repairing non-compliance, such as replacing files.

In various embodiments, after a compromise is detected but before an automated base layer merge or other repair operation is performed, the system can send a prompt to the management console 316 asking for confirmation to perform the repair. Such a prompt can also provide information about the nature of the detected compromise. The system may also suspend the endpoint 302 until a reply to the prompt is received and/or the repair is performed. Then, if a confirmation to perform the repair is received in response to the prompt, the system can proceed with the repair operation, such as enforcing a base layer.

As mentioned, in an embodiment, the system can automatically enforce a base layer 314 onto the endpoint 302 when a compromise is detected. In this case, once a compromise is detected, the server 308 can retrieve a base layer 314 from the database 312 and convey it to the endpoint 302 (e.g. to the agent 306) to merge the base layer onto the endpoint 302. In various embodiments, the base layer 314 may be a clean and compliant image of the entire contents of the endpoint; for example, this may be an image of the endpoint in the endpoint's reference state when the reference manifest is captured. This way, enforcing the base layer ensures that the endpoint will be compliant after the enforcement. Enforcement of the base layer 314 can be performed (e.g., by the agent 306) by merging the base layer onto the endpoint 302, which essentially replaces content on the endpoint 302 with content of the base layer 314 in a quick and efficient manner without the need to execute a traditional installer. Hence, the merge may be performed in an automated manner without the involvement of IT (information department) personnel to bring the endpoint into compliance.

In various embodiments, enforcement of a base layer may be performed by merging only the content of the base layer (e.g., only certain files) that causes the compromise to the endpoint's integrity (instead of downloading to the endpoint and merging the entire base layer). Namely, because the manifest comparison identifies difference between the endpoint's contents and the base layer that have triggered the non-compliance (since the reference manifest may corresponds to the base layer), the base layer enforcement may be performed by eliminating the differences causing the non-compliance. For example, instead of downloading and merging the entire base layer image, the system can download, replace, and/or remove content as necessary to bring the endpoint back into compliance with the reference manifest. For example, if the manifest comparison identifies added files, changed files, and/or missing files that have caused incompliance, then the base layer enforcement may be performed by removing the added files and replacing the changed and missing files with the original files from the base layer. The process of enforcing base layers and other types of layers is well known in the art and is implemented in existing products, such as Mirage; hence, the details of the layer merging and enforcing process will not be discussed in detail herein so as not to obscure salient points of the invention.

Generally, because the system uses a unique signature such as a hash function to identify files, an attacker may not be able to replace a file on a machine with a different, malicious file with the exact same signature. However, certain additional features can be implemented to increase security of the system. For example, the manifests may be calculated and stored in a folder or location protected from external access and tampering, e.g., by a filter driver. Such a filter driver can detect access to the disk and deny access to any operation/change in this location apart from operations done via designated paths. Further, in various embodiments, the data in the manifest can be encrypted and encoded in a binary format that only the server can read; hence, even if a potential attacker is able to access the protected folder and the manifest, he or she would not be able to modify it in meaningful ways. This prevents tampering with the manifest. In various embodiments, the manifest can be uploaded using a secure SSL (secure sockets layer) channel either over LAN (local are network) or over WAN (wide area network) with a secure gateway component. Further, in various embodiments, the integrity tool runs and performs the manifest comparisons to detect changes on the remote server, hence, the comparison is not run on the vulnerable endpoint devices.

As mentioned previously, in some embodiments, various operations that are described as performed outside of an endpoint (e.g., 302) may be performed in the endpoint (e.g., by an agent 306). These implementations may be preferable where, for example, network connectivity is not available, where relying on networks and servers is undesirable, where limited use of server-based operations is preferred, etc. In these cases, any applicable operations described as being performed on the server 308 and/or database 312 may be performed on the endpoint 302 itself, such as storing the reference manifest 310, comparing the current manifest 304 to the reference manifest 310, storing any policy files, determining whether differences or changes in manifests are compromises, implementing remedial actions such as base layer 314 enforcement actions, etc. If repairs such as enforcement of base layers 314 are implemented, then the base layers or any other components needed to perform repairs would also be stored on the endpoint. Notably, some operations could still be performed outside of the endpoint 302, as may be desired in any implementation, such as sending notifications to administrators and users.

Figure 4:
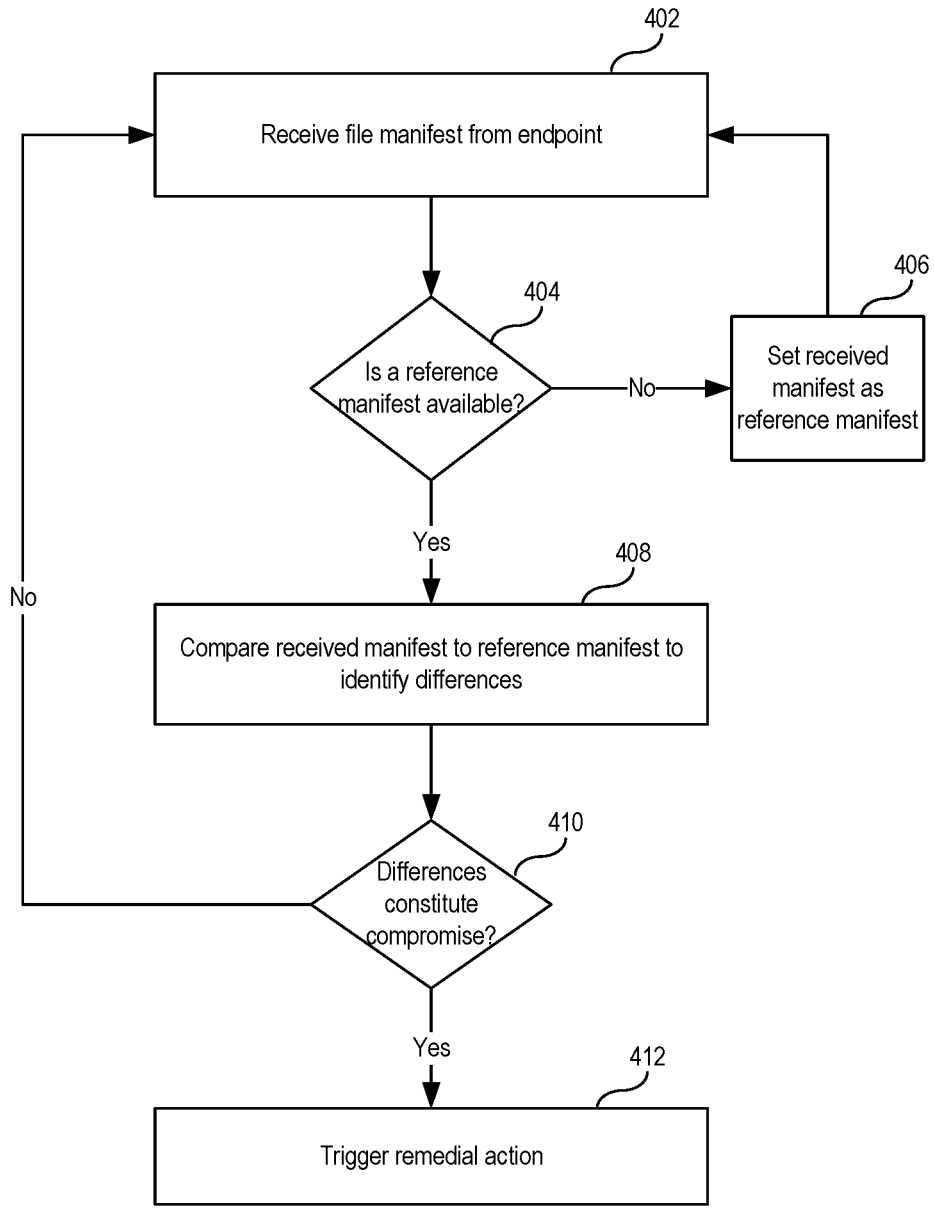
FIG. 4 illustrates an example process flow for preserving endpoint integrity, in accordance with various embodiments.

FIG. 4 illustrates an example process flow for preserving endpoint integrity, in accordance with various embodiments. The steps illustrated in the process pertain to operations performed in a server of a server-based system such as the system described in FIG. 3. However, analogous steps may be performed on the endpoint itself in different embodiments (e.g., in a self-contained system).

As illustrated, the process begins with receiving a manifest from the endpoint in operation 402. The manifest may be captured by an agent scanning the file system on the endpoint on a set schedule and conveyed to the server. In operation 404, a check is performed to determine if a reference manifest for the endpoint is available, e.g., in a data store accessible by the server. If a reference manifest is not available, then the process moves on to operation 406, where the received manifest is set as the reference manifest. From operation 406, the process can return to operation 402, where another manifest can be received from the endpoint at the next checking period (e.g., the endpoint may supply a manifest for checking integrity periodically such as every 30 minutes or every hour), and the process can repeat.

If, in operation 404, a reference manifest is available, then the process proceeds to operation 408, where the received manifest is compared with the reference manifest to identify differences between the manifests. In operation 410, a determination is made as to whether the differences identified in operation 408 constitute a compromise to the endpoint's integrity. For example, the identified differences can be checked against a policy, which determines what kind of changes are permissible and what kind of changes constitute a compromise, as discussed above. If the differences are determined to constitute a compromise, then the process proceeds to operation 412, where a remedial action is triggered. As discussed previously, remedial actions may comprise sending message notifications, performing repairs such as enforcing a base layer, suspending the endpoint, etc. If, on the other hand, the differences are not determined to constitute a compromise in operation 410, the process can return to operation 402, where another manifest can be received from the endpoint at the next checking period and the process can repeat.

In various embodiments, the system can be integrated with backup and endpoint management systems that service the endpoints. For example, certain platforms, such as Mirage, utilize file manifests for performing endpoint backups. The same manifests generated by such systems may be used by the system for preserving system integrity, as described herein. Further, certain management systems, such as Mirage, enable layer merging capabilities. The layer merging mechanism of such systems can be implemented for performing remedial actions, such as enforcing a base layer, by the system for preserving system integrity described herein.

For example, a backup and management system may operate by periodically or on a set schedule (such as hourly) receiving manifests at a central server from each of a plurality of endpoints that are managed by the server, to perform backup operations on the endpoints. As with the integrity preservation system, the frequency of manifest retrieval can be configured to suit organizational needs. The retrieved manifests are stored by the system on the server.

Each time a manifest is received at the server, the manifest is compared with a previous manifest received from the endpoint to determine what changes have taken place on the endpoint since the capturing of the last manifest. Consequently, if new files have been added to the endpoint or if files have been modified, and such files are not already available on the server, the new or modified content can be uploaded from the endpoint and stored on the server, such that complete content of the endpoint is available on the server for backup purposes. In the case of Mirage, content retrieved from endpoints is stored in a single-instance-store that operates by de-duplicating data such that only one copy of a given file needs to be stored for multiple endpoints. The manifests that are implemented in such a system may also be used by (i.e., shared with) a system for preserving endpoint integrity as described herein. For example, when a manifest is received from an endpoint, the manifest can first be compared with a reference manifest to ensure that there are no differences in the manifest that constitute a compromise. If no concerning differences are found, then the manifest can be subsequently used by the backup system to perform the endpoint synchronization or backup. The process can also be done in the opposite order, with the backup and synchronization operations being performed first.

Further, system such as Mirage include layer merging capabilities that allow the system to merge layers such as base layers and application layers onto endpoints to install and uninstall content without the need to execute traditional installers. The system employs an agent on each endpoint to perform these functions. This allows the endpoint to be overridden with files from inside the de-duplicated store to go back to a previous state or an organization mandated clean state, such as a base layer. This feature is also used to manage the image of the endpoints and deliver operating system or software updates and system settings. Thus, the described system for endpoint integrity preservation can be integrated with a system like Mirage to take advantage of its endpoint managing capabilities for performing remedial actions, such as enforcing the base layer.

Further, in a scenario where a backup and endpoint management system is integrated with an integrity preservation system, the functions of components, such as the central server and the agents on the endpoints can be integrated so that the server and/or the agents perform the functions of both systems instead of having separate servers and agents.

In further embodiments, the system can allow enterprises to obtain insight into how endpoints are being used. In this implementation, the mechanism of comparing manifests described above can be used to identify which files were changed, added, and/or removed and organize this information by file type, date, folder, etc. This allows for collection of unique statistics on organizations that may otherwise not be obtainable. In this implementation, the remedial action may be a report of the changes that is produced and conveyed to administrators or users of the system. Such systems can build reports based on the changes of multiple endpoints to help management better understand the trends of work and utilization of software in the organization.

For example, in such an implementation, the system can receive manifests from endpoints on a periodic basis and compare the manifests to a reference manifest for each endpoint. The system can identify differences between the manifests that meet criteria defined in a policy. In this case, administrators can design the policy to catch changes of interest depending on what user behavior on endpoints the administrators wish to track (e.g., what applications are being installed or used, what content is being developed, etc.). When differences meeting the policy criteria are identified, a remedial action can be triggered, which may be to produce, store, and/or send a report regarding the identified changes. Further, the system can be configured to accumulate multiple reports (e.g., periodically, such as weekly, or after a certain total number of reports is received) and to produce a summary report of the activity observed on the endpoints. Hence, such a system may provide various insights such as to show what users of endpoints are doing on the endpoints, what kind of content the users are generating, what software the users are using, and so on.

Figure 5:
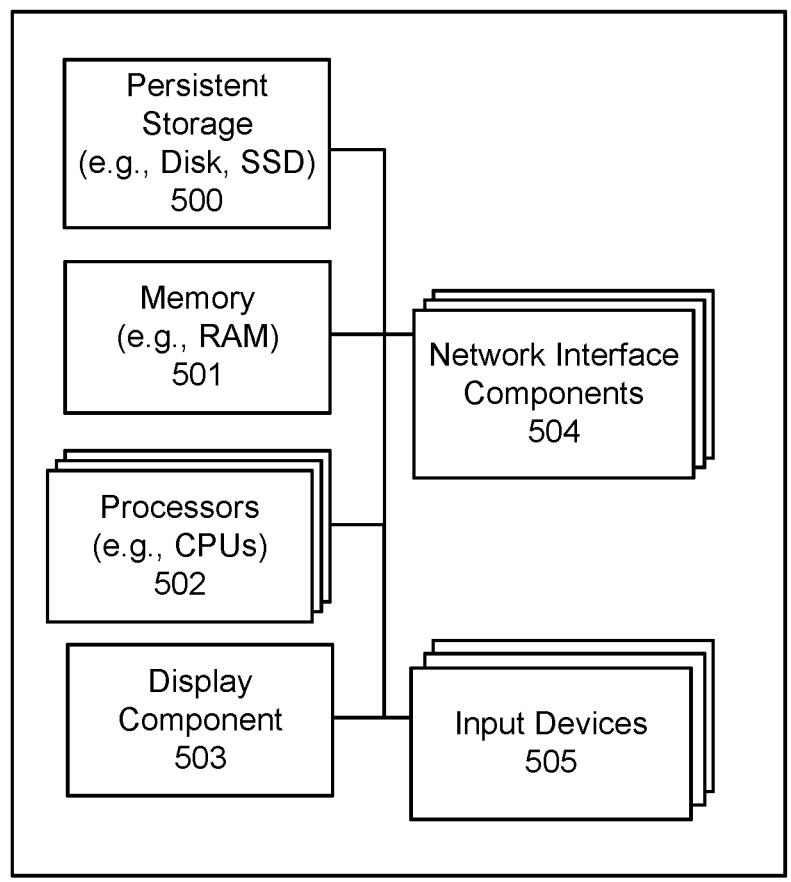
FIG. 5 illustrates an example of some general components of a computing device, in accordance with various embodiments.

FIG. 5 illustrates an example of some general components of a computing device, in accordance with various embodiments. In this example, the device includes one or more processors (e.g., central processing units (CPUs) 502 for executing instructions that can be stored in a storage medium component. The storage medium can include many types of memory, persistent data storage, or non-transitory computer-readable storage media. For example, the storage medium may take the form of random access memory (RAM) 501 storing program instructions for execution by the processor(s) 502, a persistent storage (e.g., disk or SSD) 500, a removable memory for sharing information with other devices and/or the like. The computing device typically can further comprise a display component 503, such as a monitor, a touch screen, liquid crystal display (LCD), or the like. In various embodiments, the computing device will include at least one input device 505 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 504 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for preserving integrity and performing a backup of a plurality of endpoint devices centrally managed by a central server over a network, comprising:

receiving at the central server, from each of the plurality of endpoint devices, a manifest for performing the backup and preserving integrity of the endpoint device that identifies files located in the file system of the endpoint device, the manifest containing unique file signatures of the files in the file system of the endpoint device, wherein the manifest is produced on the endpoint device by an agent operating on the endpoint device that calculates the unique file signatures of the files in the file system of the endpoint device;

wherein the received manifest is secured by performing one or more of:

storing the received manifest on the endpoint device in a location protected by a filter driver, wherein the filter driver protects the location from external access and tampering;

encrypting and encoding the received manifest in a binary format that only the central server can read; and uploading the received manifest to the central server using a secure sockets layer (SSL) channel;

for each of the plurality of endpoint devices, comparing the manifest received from the endpoint device with a reference manifest to identify differences between the received manifest and the reference manifest, wherein the reference manifest is produced by performing a full scan of the file system of the endpoint device when the endpoint device is in a clean state and calculating unique file signatures of files in the file system;

determining, based on a policy file that defines what differences from the reference manifest constitute a compromise to the integrity of the endpoint device, whether differences between the received manifest and the reference manifest constitute a compromise to the integrity of the computing device;

in response to determining that the differences between the received manifest and the reference manifest do not constitute a compromise to the integrity of the computing device based on the policy file, using the received manifest to back up the endpoint device by determining content changed on the endpoint device since a previous backup by comparing the received manifest with a previous manifest received from the endpoint device to determine what changes have taken place on the endpoint device since the capturing of the previous manifest, and uploading the changed content to the central server; and in response to determining that the identified differences constitute a compromise to the integrity of the endpoint device, triggering a remedial action.

2. The method of claim 1, wherein identifying the differences between the received manifest and the reference manifest comprises:

determining added files based on file signatures that are present in the received manifest and not present in the reference manifest;

determining missing files based on file signatures that are present in the reference manifest and not present in the received manifest; and determining file path changes based on file signatures that are the same in the reference manifest and in the received manifest but have different corresponding file paths in the received manifest and in the reference manifest.

3. The method of claim 2, further comprising:

determining that an identified difference constitutes a compromise to the integrity of the endpoint device when the identified difference includes at least one of:

an added file of a type that is deemed to be potentially harmful;

a missing file of a type that is deemed to be potentially harmful; or a file path change corresponding to a file of a type that is deemed to be potentially harmful.

4. The method of claim 1, wherein:

the policy file defines a location on the endpoint device that is deemed to be safe, and identified differences corresponding to files in the location deemed to be safe are ignored when determining whether identified differences constitute a compromise to the integrity of the endpoint device.

5. The method of claim 1, wherein the remedial action comprises conveying a message indicating the compromise to the integrity of the endpoint device.

6. The method of claim 1, wherein the remedial action comprises enforcing a base image on the endpoint device.

7. A computing device for preserving integrity and performing a backup of a plurality of endpoint devices centrally managed by a central server over a network, comprising:

at least one processor; and memory including instructions that, when executed by the at least one processor, cause the computing device to perform the steps of:

receiving at the central server, from each of the plurality of endpoint devices, a manifest for performing the backup and preserving integrity of the endpoint device that identifies files located in the file system of the endpoint device, the manifest containing unique file signatures of the files in the file system of the endpoint device, wherein the manifest is produced on the endpoint device by an agent operating on the endpoint device that calculates the unique file signatures of the files in the file system of the endpoint device;

wherein the received manifest is secured by performing one or more of:

storing the received manifest on the endpoint device in a location protected by a filter driver, wherein the filter driver protects the location from external access and tampering;

encrypting and encoding the received manifest in a binary format that only the central server can read; and uploading the received manifest to the central server using a secure sockets layer (SSL) channel;

for each of the plurality of endpoint devices, comparing the manifest received from the endpoint device with a reference manifest to identify differences between the received manifest and the reference manifest, wherein the reference manifest is produced by performing a full scan of the file system of the endpoint device when the endpoint device is in a clean state and calculating unique file signatures of files in the file system;

determining, based on a policy file that defines what differences from the reference manifest constitute a compromise to the integrity of the endpoint device, whether differences between the received manifest and the reference manifest constitute a compromise to the integrity of the computing device;

in response to determining that the differences between the received manifest and the reference manifest do not constitute a compromise to the integrity of the computing device based on the policy file, using the received manifest to back up the endpoint device by determining content changed on the endpoint device since a previous backup by comparing the received manifest with a previous manifest received from the endpoint device to determine what changes have taken place on the endpoint device since the capturing of the previous manifest, and uploading the changed content to the central server; and in response to determining that the identified differences constitute a compromise to the integrity of the endpoint device, triggering a remedial action.

8. The computing device of claim 7, wherein identifying the differences between the received manifest and the reference manifest comprises:

determining added files based on file signatures that are present in the received manifest and not present in the reference manifest;

determining missing files based on file signatures that are present in the reference manifest and not present in the received manifest; and determining file path changes based on file signatures that are the same in the reference manifest and in the received manifest but have different corresponding file paths in the received manifest and in the reference manifest.

9. The computing device of claim 8, wherein the memory further includes instructions that when executed by the at least one processor, cause the computing device to perform the steps of:

determining that an identified difference constitutes a compromise to the integrity of the endpoint device when the identified difference includes at least one of:
an added file of a type that is deemed to be potentially harmful;
a missing file of a type that is deemed to be potentially harmful; or
a file path change corresponding to a file of a type that is deemed to be potentially harmful.

10. The computing device of claim 7, wherein:
the policy file defines a location on the endpoint device that is deemed to be safe, and identified differences corresponding to files in the location deemed to be safe are ignored when determining whether identified differences constitute a compromise to the integrity of the endpoint device.

11. The computing device of claim 7, wherein the remedial action comprises conveying a message indicating the compromise to the integrity of the endpoint device.

12. The computing device of claim 7, wherein the remedial action comprises enforcing a base image on the endpoint device.

13. A non-transitory computer readable storage medium for preserving integrity and performing a backup of a plurality of endpoint devices centrally managed by a central server over a network comprising one or more sequences of instructions, the instructions when executed by one or more processors causing the one or more processors to execute the operations of:

receiving at the central server, from each of the plurality of endpoint devices, a manifest for performing the backup and preserving integrity of the endpoint device that identifies files located in the file system of the endpoint device, the manifest containing unique file signatures of the files in the file system of the endpoint device, wherein the manifest is produced on the endpoint device by an agent operating on the endpoint device that calculates the unique file signatures of the files in the file system of the endpoint device;

wherein the received manifest is secured by performing one or more of:
storing the received manifest on the endpoint device in a location protected by a filter driver, wherein the filter driver protects the location from external access and tampering;
encrypting and encoding the received manifest in a binary format that only the central server can read; and
uploading the received manifest to the central server using a secure sockets layer (SSL) channel;

for each of the plurality of endpoint devices,
comparing the manifest received from the endpoint device with a reference manifest to identify differences between the received manifest and the reference manifest, wherein the reference manifest is produced by performing a full scan of the file system of the endpoint device when the endpoint device is in a clean state and calculating unique file signatures of files in the file system;

determining, based on a policy file that defines what differences from the reference manifest constitute a compromise to the integrity of the endpoint device, whether differences between the received manifest and the reference manifest constitute a compromise to the integrity of the computing device;

in response to determining that the differences between the received manifest and the reference manifest do not constitute a compromise to the integrity of the computing device based on the policy file, using the received manifest to back up the endpoint device by determining content changed on the endpoint device since a previous backup by comparing the received manifest with a previous manifest received from the endpoint device to determine what changes have taken place on the endpoint device since the capturing of the previous manifest, and uploading the changed content to the central server; and in response to determining that the identified differences constitute a compromise to the integrity of the endpoint device, triggering a remedial action.

14. The non-transitory computer readable storage medium of claim 13, wherein identifying the differences between the received manifest and the reference manifest comprises:

determining added files based on file signatures that are present in the received manifest and not present in the reference manifest;

determining missing files based on file signatures that are present in the reference manifest and not present in the received manifest; and determining file path changes based on file signatures that are the same in the reference manifest and in the received manifest but have different corresponding file paths in the received manifest and in the reference manifest.

15. The non-transitory computer readable storage medium of claim 14, further comprising instructions that when executed by the one or more processors cause the one or more processors to execute the operations of:
determining that an identified difference constitutes a compromise to the integrity of the endpoint device when the identified difference includes at least one of:
an added file of a type that is deemed to be potentially harmful;
a missing file of a type that is deemed to be potentially harmful; or
a file path change corresponding to a file of a type that is deemed to be potentially harmful.

16. The non-transitory computer readable storage medium of claim 13, wherein:
the policy file defines a location on the endpoint device that is deemed to be safe, and identified differences corresponding to files in the location deemed to be safe are ignored when determining whether identified differences constitute a compromise to the integrity of the endpoint device.

17. The non-transitory computer readable storage medium of claim 13, wherein the remedial action comprises at least one of conveying a message indicating the compromise to the integrity of the endpoint device, or enforcing a base image on the endpoint device.

18. The method of claim 1, wherein:
the policy file defines a file type that is deemed to be safe and identified differences corresponding to files of the type deemed to be safe are ignored when determining whether identified differences constitute a compromise to the integrity of the endpoint device.

19. The computing device of claim 7, wherein:
the policy file defines a file type that is deemed to be safe and identified differences corresponding to files of the type deemed to be safe are ignored when determining whether identified differences constitute a compromise to the integrity of the endpoint device.

20. The non-transitory computer readable storage medium of claim 13, wherein:
the policy file defines a file type that is deemed to be safe and identified differences corresponding to files of the type deemed to be safe are ignored when determining whether identified differences constitute a compromise to the integrity of the endpoint device.

* * * * *